Aug. 30, 1966
E. A. GODFREY
3,269,304
EMBOSSING MACHINE
Filed July 6, 1965
2 Sheets-Sheet 1
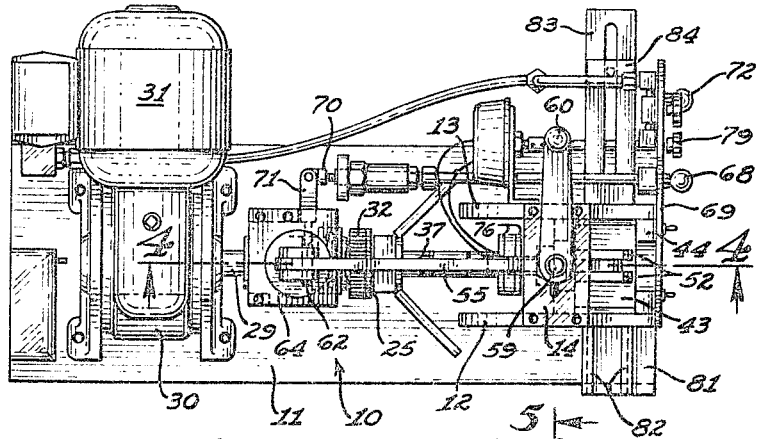
Fig. 1
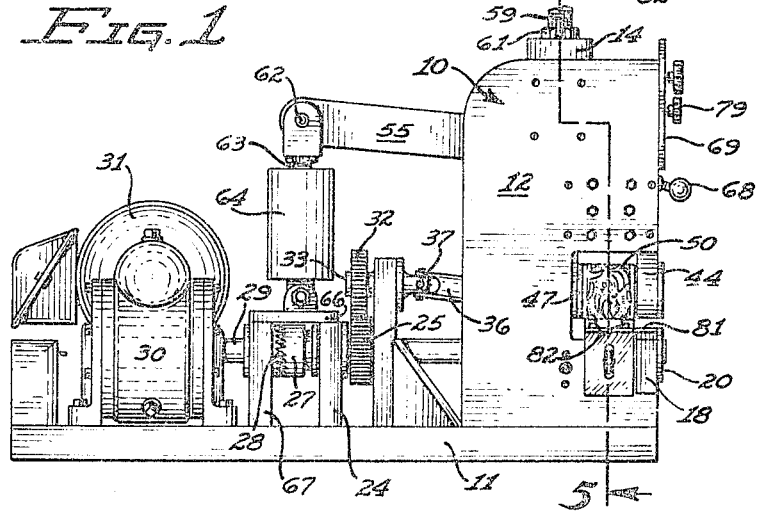
Fig. 2
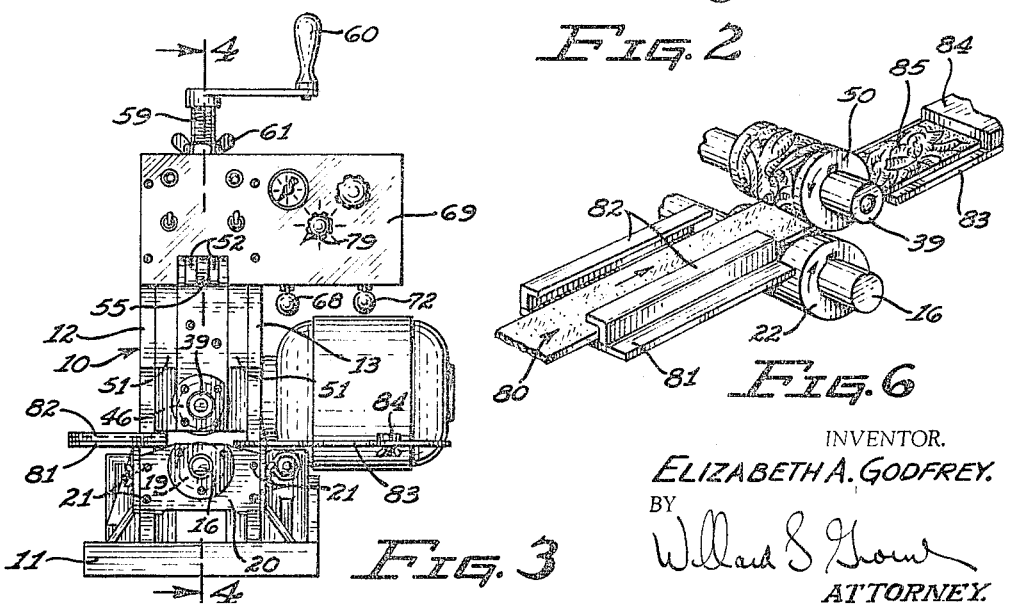
Fig. 3
Fig. 6
INVENTOR.
ELIZABETH A. GODFREY.
BY
Willard S. Grow
ATTORNEY.

Aug. 30, 1966   E. A. GODFREY   3,269,304
EMBOSSING MACHINE
Filed July 6, 1965                 2 Sheets-Sheet 2
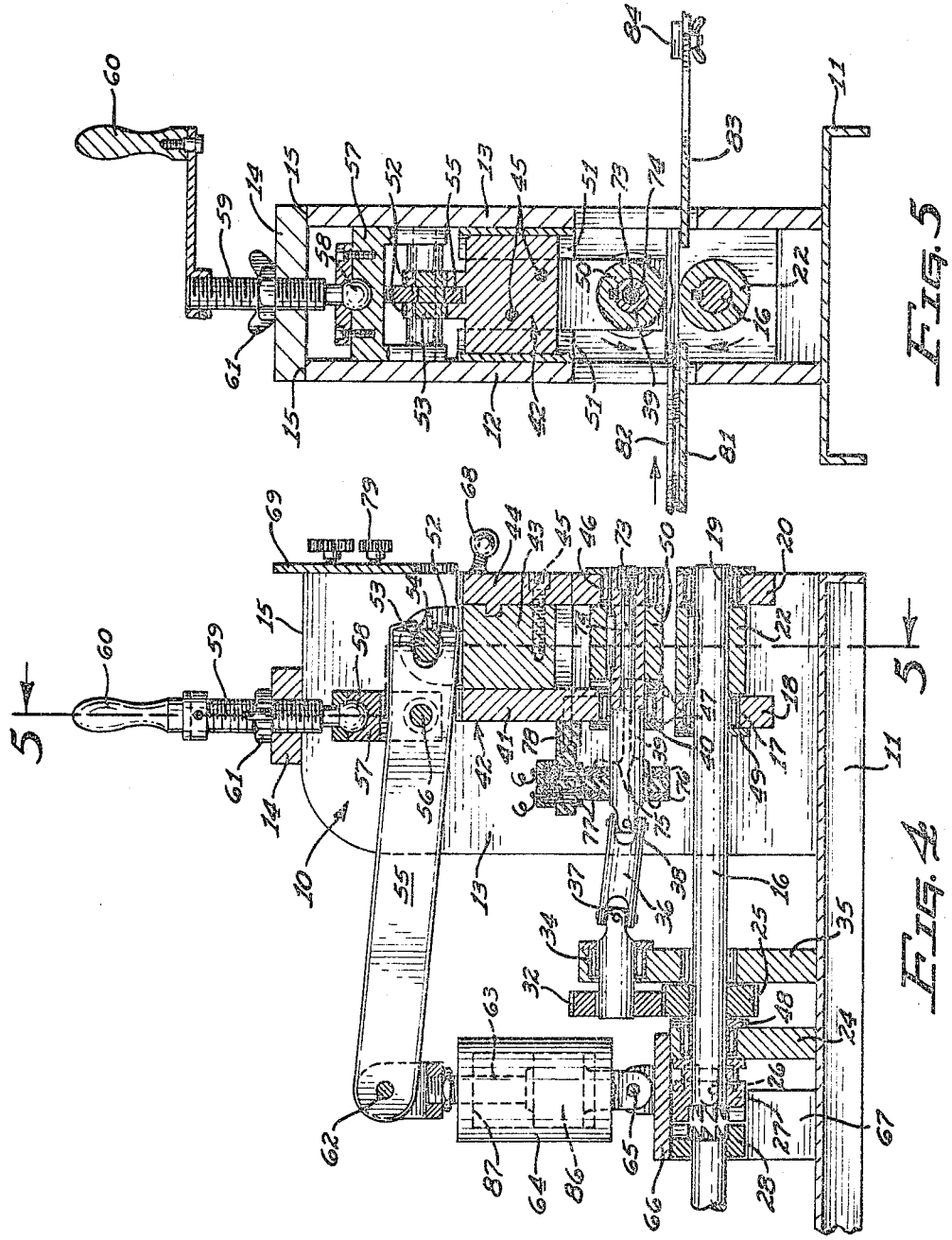
INVENTOR.
ELIZABETH A. GODFREY.
BY
Willard S. Brown
ATTORNEY.

United States Patent Office 3,269,304
Patented August 30, 1966

3,269,304
EMBOSSING MACHINE
Elizabeth A. Godfrey, 4616 S. 9th St., Phoenix, Ariz.
Substituted for abandoned application Ser. No. 202,768, June 15, 1962. This application July 6, 1965, Ser. No. 473,553
1 Claim. (Cl. 101—23)

This is a substitute application of original application Serial No. 202,768, filed June 15, 1962.

This invention pertains to embossing machines and is particularly directed to machines for embossing designs in leather, plastics and the like materials.

One of the objects of this invention is to provide a rugged and precision machine for continuously embossing strip material fed into the machine.

Another object of this invention is to provide an embossing machine which is readily and accurately adjustable to accommodate the embossing operation to the nature and thickness of the material being worked upon.

A further object of this invention is to provide an embossing machine in which various embossing dies may be readily installed and removed from the tool holders of the machine.

Further features and advantages of this invention will appear from a detailed description of the drawings in which:

FIG. 1 is a plan view of an embossing machine incorporating the features of this invention;

FIG. 2 is a left hand side elevation of the machine shown in FIG. 1;

FIG. 3 is a front elevation of the machine shown in FIGS. 1 and 2;

FIG. 4 is an enlarged sectional view on the line 4—4 of FIGS. 1 and 3;

FIG. 5 is an enlarged sectional view on the line 5—5 of FIGS. 2 and 4;

FIG. 6 is an enlarged perspective view showing the relationship of the workpiece, embossing die and hookup roller.

As an example of one embodiment of this invention, there is shown an embossing machine having a frame 10 comprising a base plate 11 on top of which are fixed the upstanding laterally spaced side plates 12 and 13 which are secured together by the tie bar 14 suitably fixed to the top surfaces 15 of the side plates 12 and 13.

A backup roller shaft 16 is journaled in a suitable bearing 17 carried in the bearing block 18 suitably fixed to the side plates 12 and 13. The front end of the backup roller shaft 16 is journaled in a suitable bearing 19 carried in a demountable bearing block 20 adapted to be secured to the side plates 12 and 13 by suitable screws 21. By removing the bearing block 20 the backup roller 22 may be placed in driven position on the shaft 16 or removed therefrom as required.

The rear end of the backup shaft 16 is journaled in a suitable bearing 23 carried in a bearing support block 24 fixed to the base plate 11. Intermediate the bearings 18 and 23 and adjacent the bearing 23 is a gear 25 fixed to the shaft 16. On the opposite side of the bearing 23 is slidably mounted, on the splined portion 26 of the rear end of the shaft 16, a shiftable clutch member 27 which is arranged to engage a mating clutch member 28 fixed to the output shaft 29 of the gear reduction unit 30 driven by a suitable electric motor 31.

The gear 25 on shaft 16 drives a mating gear 32 of the same size as the gear 25 which is fixed on the stub shaft 33 journaled in and axially slidable in the bearing 34 carried in the support bracket 35 fixed to the base plate 11. A propeller shaft 36 is connected by a universal joint 37 to the stub shaft 33 and by the universal joint 38 to the impression die arbor shaft 39. The arbor shaft 39 is journaled intermediate its ends in a suitable bearing 40 carried in the rear plate 41 of the arbor shaft carriage 42 comprising the guide block 43 fixed to the rear plate 41 and the demountable front plate 44 secured to the block 43 by suitable screws 45. A front support bearing 46 is carried in the demountable front plate 44 to journal and support the front end of the arbor shaft 39. Suitable lock washers 47 fixed to the arbor shaft 39 and abutting the sides of the rear plate 41 confine the arbor shaft against axial movement in the bearings 40 and 46. Suitable lock washers 48 and 49 fixed on the backup roller shaft 16 confine this shaft against axial movement in the bearings 17, 19 and 23. The embossing die 50 may be mounted in driven relationship on the arbor shaft 39 by removing the demountable front plate 44.

The arbor shaft carriage 42 is supported in vertical guideways 51 on the side plates 12 and 13 and its guide block 42 has integral upstanding bosses 52 which carry a pin 53 received in a slot 54 formed in the front end of a lever arm 55 which is pivotally mounted intermediate its ends on a pin 56 carried in the inverted U-shaped adjusting member 57 having a ball joint connection 58 with the lower end of an adjusting screw 59. The adjusting screw 59 is threaded in the tie bar 14 for vertical adjustment therein as the screw 59 is appropriately rotated by the crank handle 60, the screw being adapted to be clamped in desired adjusted position by the winged jam nut 61.

The rear end of the lever arm 55 is pivotally connected by a pin 62 to the outer end of the piston rod 63 of the fluid pressure cylinder 64 which cylinder is pivotally connected by a pin 65 to a plate 66 fixed to the bearing support block 24 and the bracket 67 fixed to the base plate 11.

The power clutch 27–28 is controlled to engage and disengage the shiftable clutch member 27 from the control lever 68 at the control panel 69 mounted on the side plates 12 and 13 at the front of the machine, the lever 68 being connected by suitable linkage 70 to actuate the shifter lever 71 to shift the clutch member 27. Pressure control for the cylinder 64 is affected by the control lever 72 on the control panel 69. In certain instances it may be desirable to heat the embossing die 50. To this end there is provided a heating element 73 located within a bore 74 formed within the arbor shaft 39 so as to convey heat to the embossing die. Power is supplied to the heating element 73 from leads 75 connected to suitable slip rings 76 and the brushes 77 carried on the insulative bracket 78 fixed to the rear plate 41. A suitable temperature control knob 79 is provided on the panel 69.

In operation: The workpiece 80 is placed on the work feeding table 81 between suitable guideways 82 and pushed between the backup roller 22 and die roller 50. Motor 31 is energized constantly. Lever 68 is operated to engage clutch 27 to apply power to rotate the rollers 22–50. As the workpiece 80 is fed through the rollers 22–50 it emerges onto the receiving table 83 until it engages a stop 84 at which point the clutch 27 is disengaged by the clutch control lever 68. Lever 72 is then operated to energize cylinder 64 to pull the rear end of the lever 55 downwardly to raise the embossing roller 50 from operative contact with the workpiece 80 after the desired embossing 85. The workpiece may then be removed from between the rollers 22–50.

The cylinder 64 is then energized to return the rear end of the lever 55 upwardly until the piston 86 engages the upper surface 87 of the cylinder 64 to positively stop the upward travel of the rear end of the lever 55. In order to adjust for the proper clearance between the rollers 22–50 for operating upon various thicknesses and character of workpieces 80, the crank handle 60 is manipulated to raise and lower the pivot pin 56 for the lever 55 as required and thus select the proper vertical position for the embossing die roller relative to the backup roller 22. During these adjustments by the crank handle 60 it will be noted that stub shaft 33 and gear 32 move axially relative to the bracket 35 and gear 25 so as to at all times provide proper drive for the embossing die for any vertical adjusted position of the arbor support carriage.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention, what is claimed and desired to be obtained by United States Letters Patent is:

An embossing machine comprising in combination:
(A) a frame,
(B) a backup roller journaled against axial and radial movement on said frame,
(C) a carriage mounted and guided for vertical sliding movement on said frame,
(D) a cylindrical embossing die journaled against axial and radial movement on said carriage located radially above and axially aligned with said backup roller,
(E) drive means mounted on said frame for simultaneously rotating said backup roller and said embossing die in opposite directions for any relative radial position of said members,
(F) a lever arm,
(G) a pivot pin pivotally supporting said lever arm at a point intermediate the ends thereof,
(H) manually actuable means on said frame for positively supporting and adjustably varying the vertical position of said pivot pin during the operation of the machine radially relative to said backup roller,
(I) a pivotal sliding connection between the front end of said lever arm and said carriage,
(J) an expandable and contractable power actuated device interconnected between said frame and the rear end of said lever arm including,
(K) an actuating element connected to swing the rear end of said lever arm relative to said frame so as to move said embossing die during the operation of the machine to and from a predetermined fixed positive radial operative position relative to said backup roller,
(L) and a positive stop element engaged by said actuating element to positively limit movement of said carriage and embossing die to said predetermined fixed operative position relative to said backup roller during the operation of said machine.

References Cited by the Examiner

UNITED STATES PATENTS

| | | | |
|---|---|---|---|
| 1,857,166 | 5/1932 | Speicher | 101—5 |
| 1,925,236 | 9/1933 | Doyle et al. | 101—4 |
| 3,128,692 | 4/1964 | Talarico | 101—27 X |
| 3,189,011 | 6/1965 | Briggs | 74—522 X |

FOREIGN PATENTS 216,424    12/1941   Switzerland.

ROBERT E. PULFREY, *Primary Examiner.*

DAVID KLEIN, *Examiner.*

W. F. McCARTHY, *Assistant Examiner.*